United States Patent
Selwan

(10) Patent No.: US 7,268,755 B2
(45) Date of Patent: Sep. 11, 2007

(54) ARCHITECTURE FOR SMART LCD PANEL INTERFACE

(75) Inventor: Pierre M. Selwan, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 10/397,925

(22) Filed: Mar. 25, 2003

(65) Prior Publication Data

US 2004/0189570 A1    Sep. 30, 2004

(51) Int. Cl.
G09G 3/36 (2006.01)
G09G 5/00 (2006.01)
G09G 5/399 (2006.01)

(52) U.S. Cl. .................. 345/87; 345/211; 345/539; 345/547

(58) Field of Classification Search .............. 345/87, 345/211–213, 501–522
See application file for complete search history.

(56) References Cited

U.S. PATENT DOCUMENTS

| | | | | |
|---|---|---|---|---|
| 4,036,550 A | | 7/1977 | Yin | |
| 5,434,589 A | * | 7/1995 | Nakamura et al. | 345/98 |
| 5,659,338 A | * | 8/1997 | Nakasuji et al. | 345/536 |
| 5,745,105 A | * | 4/1998 | Kim | 345/212 |
| 5,757,365 A | * | 5/1998 | Ho | 345/212 |
| 5,828,367 A | * | 10/1998 | Kuga | 345/211 |
| 5,978,052 A | * | 11/1999 | Ilcisin et al. | 348/797 |
| 6,356,260 B1 | * | 3/2002 | Montalbo | 345/204 |
| 6,611,260 B1 | * | 8/2003 | Greenberg et al. | 345/204 |
| 6,661,414 B1 | * | 12/2003 | Miyamoto | 345/213 |
| 6,809,337 B2 | | 10/2004 | Winer | |
| 6,816,138 B2 | * | 11/2004 | Huang et al. | 345/87 |
| 7,119,786 B2 | | 10/2006 | Cui | |
| 2002/0027541 A1 | * | 3/2002 | Cairns et al. | 345/87 |
| 2002/0080134 A1 | * | 6/2002 | Antila | 345/213 |
| 2002/0190940 A1 | * | 12/2002 | Itoh et al. | 345/87 |

* cited by examiner

Primary Examiner—Richard Hjerpe
Assistant Examiner—M. Fatahiyar
(74) Attorney, Agent, or Firm—Blakely, Sokoloff, Taylor & Zafman LLP

(57) ABSTRACT

An architecture for a smart liquid crystal display (LCD) panel interface is described. The architecture enables a circuit to transfer only updated display data to the interface. When there are no display data updates to transfer, the circuit is placed in the lowest power state to reduce power consumption while the interface displays information locally stored.

22 Claims, 3 Drawing Sheets

ARCHITECTURE FOR SMART LCD PANEL INTERFACE

FIELD OF THE INVENTION

The present invention pertains to the field of integrated circuit design. More particularly, the present invention relates to a graphics architecture for reducing power and optimizing bandwidth.

BACKGROUND OF THE INVENTION

FIG. 1A depicts an Unified Memory Architecture (UMA) for processing graphics to display on a liquid crystal display (LCD) panel 130. A central processing unit (CPU) 110 is coupled to a chipset 120. The chipset 120 comprises a main memory 122 and a memory controller hub (MCH) 124. The MCH 124 is the central hub for processing data. The MCH is also coupled to a graphics engine 126 and a display controller 128. The CPU 110 determines what data is to be displayed. Data that is to be displayed is accessed from main memory 122 by the MCH 124.

Data is stored in main memory 122 in packet format. The packet comprises a header portion and a payload portion. The header provides the position and dimension of the image to be displayed. The payload contains the data of the image to be displayed. Thus, the packet graphics files must be rasterized or reconstructed out of those components before they can be presented as an actual image on the panel 130. The graphics engine 126 computes and creates a bitmap of the data accessed by the MCH 124. The bitmapped file contains pixel image data. Each dot on the LCD panel 130 is represented by data in the bitmapped file. The display controller 128 sends the data stream of pixels to a panel 130 to be displayed.

FIG. 1B depicts a Discrete Graphics Architecture (DGA) for processing graphics to display on a LCD 170. For this system, a CPU 140 is coupled to a chipset 150. The chipset 150 comprises a main memory 152 and a MCH 154. The MCH 154 is the central hub for processing data. In contrast to the system of FIG. 1A, graphics engine 162 and display controller 164 are located on a discrete graphics chip 160 rather than on the chipset 150. In addition, the discrete graphics chip 160 comprises a local frame buffer 166 for graphics engine 162. The data that is to be displayed on LCD 170 is obtained from the frame buffer 166 rather than main memory 152.

When the system is idle in the UMA, the CPU 110 and the MCH 124 may not quiesce to the lowest power state because the circuits have to maintain the data display stream to the LCD panel 130. A computer system may be in an idle state when no data is being entered into the computer and when no programs are running. An user input such as a mouse-click or a key stroke brings the CPU 110 out of idle. The DGA of FIG. 1B may be more efficient than the UMA because the UMA drives data from a large main memory 152 to the LCD 170 while the DGA drives a smaller, dedicated, and less shallow memory subsystem to the LCD 170. The CPU 140 and the MCH 124 of the DGA, however, also do not quiesce when the system is idle. In both the UMA and the DGA, an image frame is periodically transferred to the LCD panels 130 and 170, regardless if the new frame is different from the previous frame.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1A:
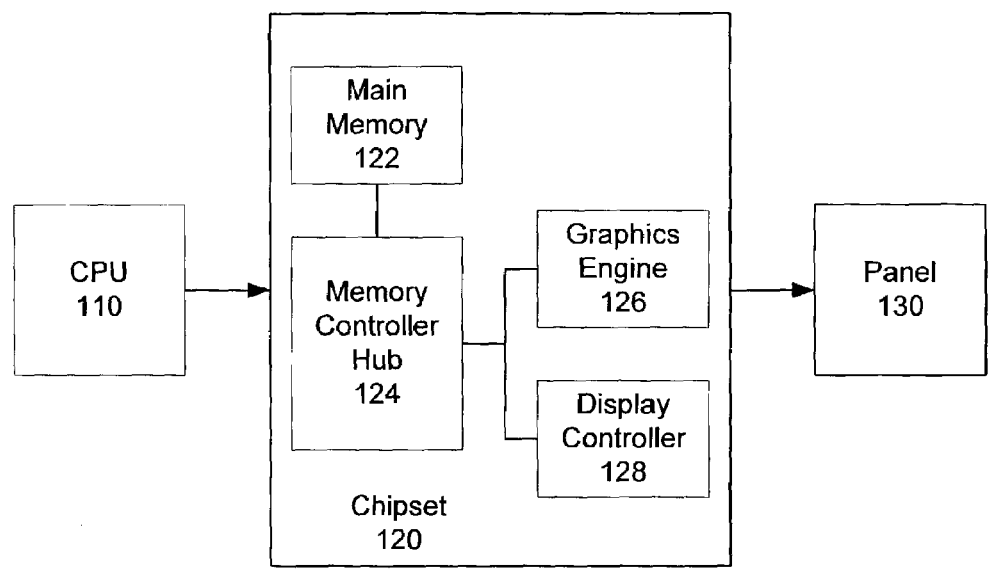
FIG. 1A is a prior art Unified Memory Architecture that delivers data to a LCD panel.
Figure 1B:
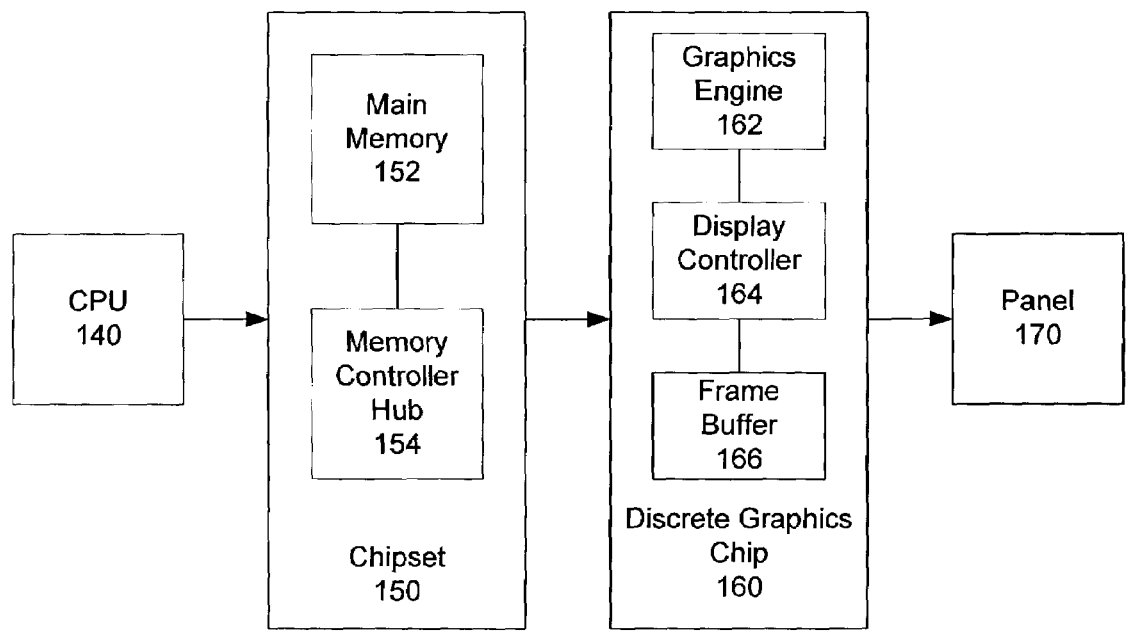
FIG. 1B is a prior art Discrete Graphics Architecture that delivers data to a LCD panel.
Figure 2:
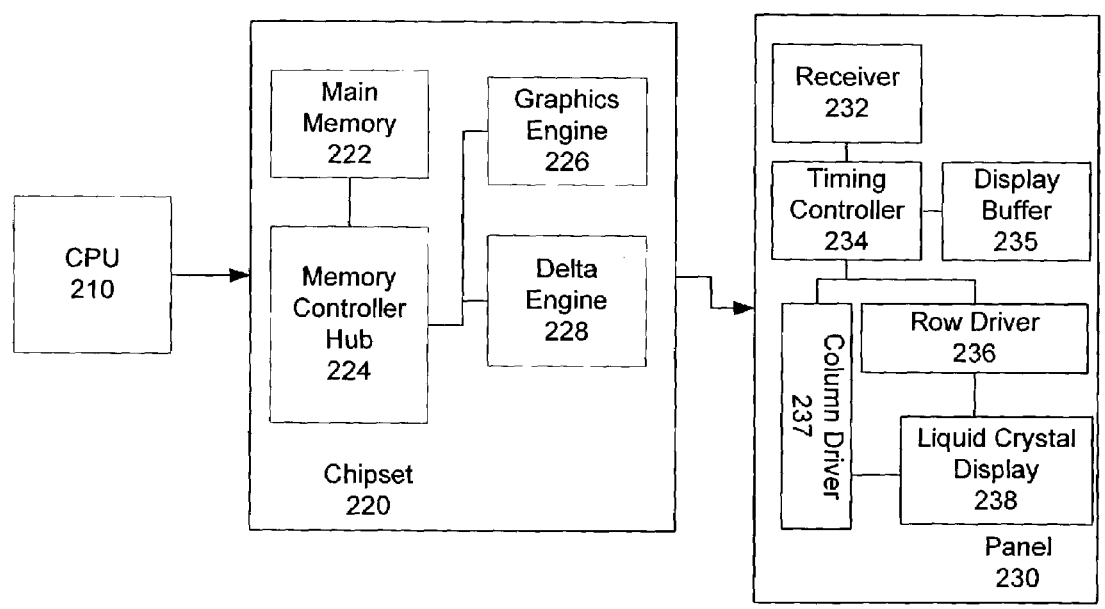
FIG. 2 is an embodiment of an Unified Memory Architecture for delivering data to a LCD panel that reduces idle power consumption and optimizes bandwidth.

FIG. 2 depicts an embodiment of an UMA for optimizing bandwidth and reducing idle power consumption in a computer system. For this embodiment of the invention, CPU 210 is coupled to chipset 220. Chipset 220 comprises a MCH 224 that is coupled to a main memory 222, a graphics engine 226, and a delta engine 228. The chipset 220 is coupled to a panel 230. The panel 230 comprises a receiver 232. The receiver 232 is coupled to a timing controller 234. The timing controller 234 is coupled to a display buffer 235, a row driver 236, and a column driver 237. The row driver 236 and the column driver 237 are coupled to a liquid crystal display (LCD) 238.

The power consumption of the UMA of FIG. 2 is reduced because the CPU 210 and the chipset 220 may be quiesced or placed in the lowest power state if there is no updated data to display on panel 230. In other words, the CPU 210 and the chipset 220 do not maintain a periodic stream of data to the panel 230 when the system is idle. A new image frame is sent to the panel 230 only if the new image frame is different from the previous image frame. The CPU of a mobile platform may be in idle approximately 70% of the time. Therefore, allowing idle circuits such as the CPU 210 and the chipset 220 to quiesce to the lowest power state helps to save battery life in a mobile platform. Power savings, however, may also be achieved in other systems such as a desktop platform.

If CPU 210 determines that a display update is required, the CPU 210 sends instructions to the chipset 220 to transmit the new image to the panel 230. When the CPU 210 requests an image update, the MCH 224 accesses the requested data from the main memory 222. The graphics engine 226 creates a bitmap of the data obtained from main memory 222. The delta engine 228 then transmits the bitmap of the updated data to the panel 230. The delta engine 228 only transmits data to the panel 230 if the new image frame is different from the previous image frame.

For one embodiment of the invention, each bitmapped pixel of the LCD 238 may be comprised of 18 bits of colors. For example, the colors may comprise six bits of red, six bits of green, and six bits of blue. For another embodiment of the invention, each pixel may be described using 24 colors. In addition to color, each pixel may comprise a display enable bit, a clock bit, and a plurality of raster bits. The raster bits may comprise a line pulse (LP) and a first line marker (FLM). The LP signal is a line synchronization pulse that latches a line of display data into the column driver 237. The LP signal becomes active when a line of pixel data is clocked into the panel 230 and stays asserted for a duration approximately equal to the number of pixel clock periods. The FLM signal may indicate the start of a new display frame. The FLM signal activates each subsequent pixel row of the LCD 238 through the row driver 236. The FLM signal is asserted after a first LP signal of the frame until a second LP signal is detected. The FLM signal then remains deasserted until the next frame. The data updates are transferred to the panel 230 when LP is asserted.

The data may be transmitted to panel 230 using high speed serial bus. Alternatively, the data may be transmitted via a low voltage differential swing signal. Thus, the receiver 232 may comprise a low voltage differential swing input/output buffer. When no update is received from chipset 220, the timing controller 234 transmits a bitmapped image to be displayed from display buffer 235. By providing a localized storage area to obtain data, the display buffer 235 helps to minimize the need to fetch data from main memory 222. The main memory 222 may be used to store many different types of data. As a result, the main memory 222 may be accessed by circuits of a computer system for many reasons other than fetching display data. Contention in accessing data from main memory 222 may potentially decrease the efficiency of the system. Therefore, the display buffer 235 helps to optimize the bandwidth of main memory 222 and to increase the efficiency of the system.

When an update is received, however, the timing controller 234 transmits the bitmapped image as received by receiver 232 to the row driver 236 and the column driver 237. The updated image may also be stored in the display buffer 235. The row driver 236 and column driver 237 may display the image on the LCD 238 by sweeping across each line of the image, working their way down the LCD 238 from line to line.

Figure 3:
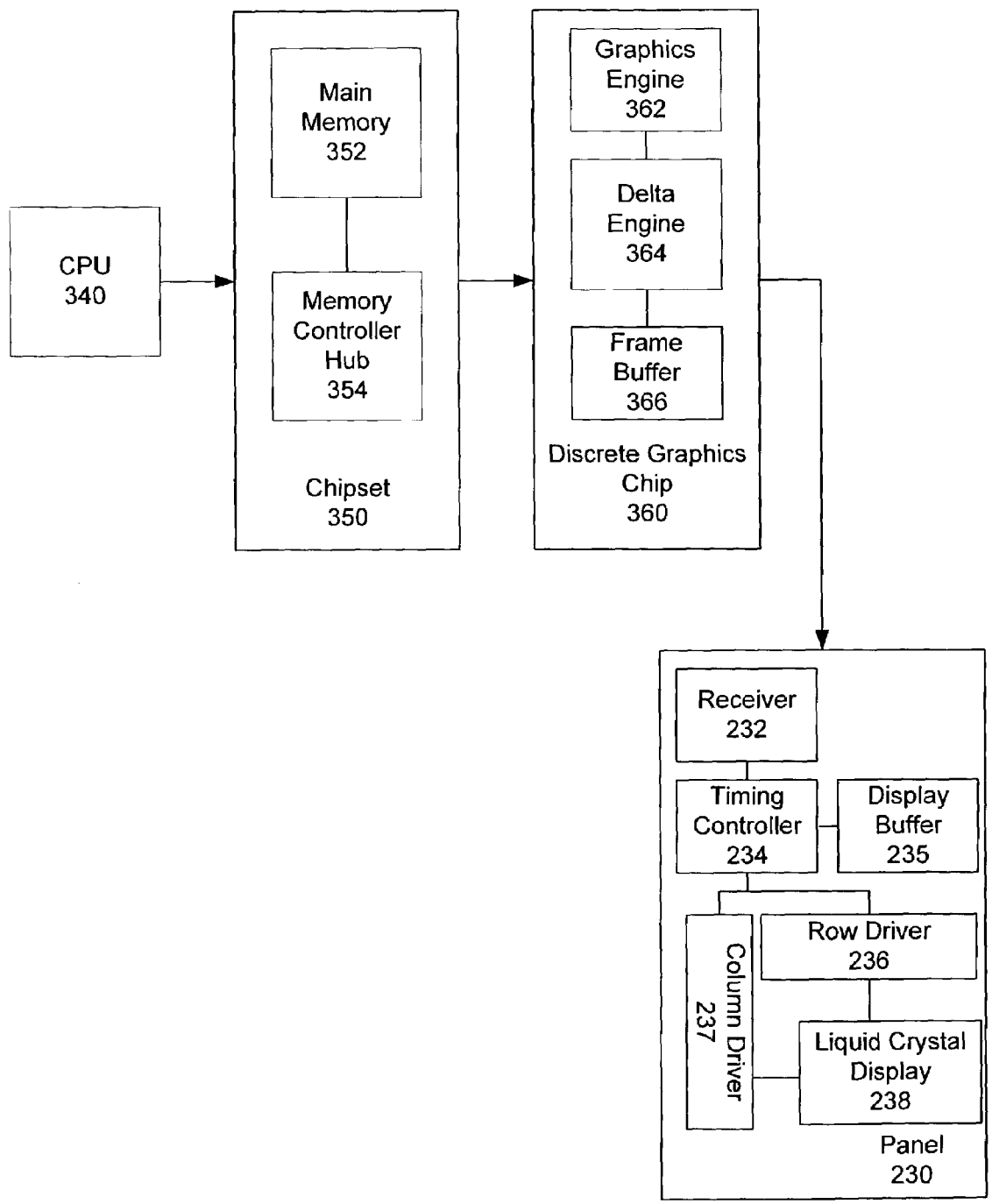
FIG. 3 is an embodiment of a Discrete Graphics Architecture for delivering data to a LCD panel that reduces idle power consumption and optimizes bandwidth.

FIG. 3 depicts an embodiment of a DGA for optimizing bandwidth and reducing idle power consumption in a computer system. For this embodiment of the invention, CPU 340 is coupled to chipset 350. The chipset 350 comprises a main memory 352 coupled to a MCH 354. The chipset 350 is coupled to a discrete graphics chip 360. The discrete graphics chip 360 comprises a delta engine 364 that is coupled to a graphics engine 362 and a frame buffer 366. The discrete graphics chip 360 is coupled to a panel 230. The panel comprises a receiver 232 coupled to a timing controller 234. The timing controller 234 is coupled to a display buffer 235, a row driver 236, and a column driver 237. The row driver 236 and the column driver 237 are coupled to a liquid crystal display 238. The storage capacity of the frame buffer 366 is a function of the resolution and pixel depth of the liquid crystal display 238.

The power consumption of the DGA of FIG. 3 may be reduced by placing the CPU 340, the chipset 350, and the discrete graphics chip 360 in the lowest power state if there is no updated data to display on panel 230. CPU 340, chipset 350, and discrete graphics chip 360 do not maintain a stream of data to the panel 230 when the system is idle. However, if CPU 340 detects a display update, CPU 340 sends instructions to chipset 350 and discrete graphics chips 360 to transmit the new image to the panel 230.

After the MCH 354 receives the CPU 340 instructions, the MCH accesses the main memory 352 for command instructions and passes the information to the discrete graphics chip 360. The graphics engine 362 of the discrete graphics chip 360 then obtains the updated display from the frame buffer 366. The graphics engine 362 creates a bitmap of the data file obtained from the frame buffer 366. The delta engine 364 then transmits the updated data to the panel 230. The processing of the graphics may be performed out of phase with respect to any other CPU 340 processes to further reduce power consumption.

The panel 230 of the DGA operates in the same manner as described above for the UMA. For one embodiment of the invention, the panel 230 may be used with a notebook, mobile or laptop system. For another embodiment of the invention, the panel 230 may be used with a desktop system.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A system, comprising:
 a central processing unit (CPU);
 a chipset, wherein the chipset comprises a main memory coupled to a delta engine; and
 a panel coupled to the chipset, wherein the panel comprises a liquid crystal display (LCD) coupled to a display buffer, wherein the CPU and the chipset are placed in a lowest power state if the delta engine determines that a stored image frame stored on the display buffer is the same as an updated image frame sent to the chipset by the CPU when the stored image frame is compared to the updated image frame.

2. The system of claim 1, wherein the updated image frame is transferred to the panel by the delta engine if the updated image frame is different than the stored image frame when compared to the stored image frame.

3. The system of claim 1, wherein the stored image frame stored on the display buffer is provided to the LCD while the CPU and the chipset are in the lowest power state until the delta engine transfers an updated image frame to the panel.

4. The system of claim 1, wherein the chipset further comprises a memory controller hub (MCH) coupled to the main memory, wherein the MCH obtains the updated image frame from the main memory, wherein the updated image frame obtained from the main memory is in packet format.

5. The system of claim 4, wherein the chipset further comprises a graphics engine coupled to the MCH, wherein the graphics engine interprets the packet data and updates a corresponding area of a bitmap.

6. The system of claim 1, wherein the panel further comprises a row driver and a column driver coupled to the LCD, wherein the row driver and the column driver display a bitmapped image on the LCD.

7. The system of claim 1, wherein the updated image frame comprises a first line marker (FLM) signal and a line pulse (LP) signal, wherein the FLM signal indicates the start of a new display frame, wherein the LP signal is a line synchronization pulse that latches a line of display data into the column driver.

8. The system of claim 7, wherein the delta engine transfers the updated image frame to the panel when the LP signal is asserted, the LP signal indicating that the updated image frame is different from the stored image frame when compared to the stored image frame.

9. The system of claim 1, wherein the system is a laptop computer.

10. The system of claim 1, wherein the system is a desktop computer.

11. A system, comprising:
a chipset having a main memory;
a discrete graphics chip coupled to the chipset, wherein the discrete graphics chip comprises a frame buffer, a delta engine, and a graphics engine, wherein the storage capacity of the frame buffer is less than the storage capacity of the main memory; and
a panel coupled to the discrete graphics chip wherein the panel comprises a liquid crystal display (LCD) coupled to a display buffer, wherein the display buffer stores a stored image frame to be displayed on the LCD, wherein the discrete graphics chip is configured to send an updated image frame to the panel only in response to a determination that the updated image frame is different from the stored image frame.

12. The system of claim 11, wherein the storage capacity of the frame buffer is a function of a resolution and a pixel depth of the LCD.

13. The system of claim 11, wherein the chipset further comprises a memory controller hub (MCH) coupled to the main memory, wherein the MCH obtains a plurality of command signals from the main memory, wherein the MCH transfers the command signals to the discrete graphics chip.

14. The system of claim 13, wherein the command signals comprise a first line marker (FLM) signal and a line pulse (LP) signal, wherein the FLM signal indicates the start of a new display frame, wherein the LP signal is a line synchronization pulse that latches a line of display data into the column driver.

15. The system of claim 14, wherein the image update circuit transmits color updates to the panel when the LP signal is asserted.

16. A method, comprising:
storing a stored image frame on a delay buffer of a liquid crystal display (LCD) panel
generating an updated image frame on a central processing unit (CPU);
transferring the updated image frame through a chipset to a discrete graphics chip comprising a graphics engine, a delta engine, and a frame buffer;
comparing the updated image frame to the stored image frame with the delta engine to determine whether the updated image frame is different than the stored image frame; and
placing the CPU, the chipset, and the discrete graphics chip in a lowest power mode available if the delta engine determines that the updated image frame is the same as the stored image frame.

17. The method of claim 16, further comprising:
changing the CPU, the chipset, and the discrete graphics engine from the lowest power mode available to a higher power mode if the delta engine determines that the updated image frame is different from the stored image frame.

18. The method of claim 17, further comprising:
sending the updated image frame from the delta engine to the LCD panel.

19. The method of claim 16, further comprising:
obtaining the display data frame to be displayed on the LCD from the display buffer if the IC is in the lowest power state.

20. The system of claim 1, wherein the LCD comprises:
a timing controller; and
a receiver coupled to the timing controller, wherein the receiver is configured to receive the updated image frame only if the stored image frame within the display buffer is different from the updated image frame and to transfer the updated image frame to the timing controller, wherein the timing controller drives the updated image frame to a column driver and a row driver, wherein the column driver and the row driver display the updated image frame on the LCD.

21. The circuit of claim 20, wherein the timing controller obtains display data from the display buffer if the receiver does not receive the updated image frame.

22. The circuit of claim 20, wherein the receiver is a low voltage differential swing input/output buffer.

* * * * *